Patented Oct. 10, 1950

2,525,049

UNITED STATES PATENT OFFICE 2,525,049

CELLULOSE TITANATE FILM PRODUCTION

Frank Kerr Signaigo, Kenmore, N. Y., assignor to E. I. du Pont de Nemours & Company, Wilmington, Del., a corporation of Delaware No Drawing. Application August 22, 1946, Serial No. 692,383

2 Claims. (Cl. 260—212)

This invention relates to cellulose derivatives and more particularly to the modification of regenerated cellulose films and fibers by treatment and reaction with a soluble compound of titanium to effect titanation of the cellulose.

Because of the transparency of regenerated cellulose films to ultraviolet light, foodstuffs wrapped in such films frequently develop rancidity when exposed to sunlight. Additionally, such films tend to deteriorate after exposure to sunlight and are also objectionably sensitive to moisture.

It is an object of this invention to provide a novel method for so modifying the properties of regenerated cellulose film that its opacity to ultraviolet light is advantageously increased and its rate of deterioration when exposed to sunlight and sensitivity toward moisture are considerably reduced. Other objects and advantages of the invention will be evident from the ensuing description thereof.

These objects are accomplished by this invention which comprises treating a regenerated cellulose film or fiber with a titanium salt solution, under such conditions that titanium becomes incorporated as a permanent, integral and chemical component of the cellulose in the form of cellulose titanate.

In a more specific and preferred embodiment, the invention comprises subjecting a regenerated cellulose film to treatment with a titanyl sulfate solution under such conditions that a cellulose titanate product containing at least 1% of titanium results.

It has been found in accordance with the invention that regenerated cellulose films rapidly absorb titanium from solutions of active titanium salts such as titanyl sulfate, when soaked in solutions of such salts and subsequently washed with dilute solutions of ammonia or alkalies (sodium hydroxide, potassium hydroxide, etc.), followed by thorough washing in water. The resulting treated films are then converted to transparent, colorless, sulfate-free films containing up to 18-20% by weight of titanium. The modified films so prepared withstand boiling in water and ammonium hydroxide for prolonged periods, are insoluble in cuprammonium solutions, and can be readily softened with glycerol and other well-known softening agents. As little as 1% titanium incorporated in the films renders them substantially opaque to ultraviolet light below 3100 A. U.

When certain foodstuffs or other perishable articles are packaged in the resulting, essentially transparent titanated films exposed to sunlight, development of rancidity is rapidly reduced over the unmodified cellulose. Additionally, the titanium-modified films are much less sensitive to moisture than are said unmodified films.

Although the structure of the regenerated cellulose modified with titanium is not known with certainty, the insolubility of the titanated films in cuprammonium solutions, and their transparency at titanium contents as high as 18% evidences the existence of a chemical combination in the form of cellulose titanate.

To a clearer understanding of the invention, the following, more specific examples thereof are given, these being merely illustrative and not to be taken as in limitation of the invention:

Example I

A solution of titanyl sulfate ($TiOSO_4 \cdot 2H_2O$) containing the equivalent of 12 parts by weight of $TiO_2$ is prepared by dissolving 29.4 parts of $TiOSO_4 \cdot 2H_2O$ in 70.6 parts of water. Freshly-cast films of regenerated cellulose (gel regenerated cellulose) are then soaked in this solution at room temperature for 15 minutes, after which they are washed for 30 minutes in a 10% aqueous solution of ammonia, followed by thorough washing in water, and drying. Colorless, transparent titanated films are thus obtained which are free from sulfate, and contain 15-18% of titanium by weight. The films so prepared withstand boiling in water and ammonium hydroxide without undergoing deterioration and are insoluble in cuprammonium solutions. As little as 1% of titanium in the film rendered the film substantially opaque to ultraviolet light below 3100 A. U.

The cellulose titanate film prepared as described in this example had the following analysis:

| | Percent |
|---|---|
| Carbon | 30.86 |
| Hydrogen | 4.81 |
| Titanium | 17.86 |
| Sulfate | 0.0 |

This corresponds to the empirical formula $C_6H_{11}O_7Ti$.

Example II

Titanium is introduced into films of plain, transparent unmodified cellophane in a manner similar to that described in Example I above by first preswelling the film in water for at least 15 minutes, and then treating the film for 5 minutes at room temperature in titanyl sulfate solutions containing the equivalent of about 10% of $TiO_2$, and rinsing the treated film successively in dilute ammonia solution and water. The resulting film manifested greatly increased resistance to the action of sunlight and water.

*Example III*

Freshly-spun viscose rayon yarns of both high and low tenacity are soaked for about 15 minutes in solutions of titanyl sulfate equivalent to 1% of $TiO_2$ followed by ammonia treatment and water washing. A low tenacity yarn absorbed 1.0–2.0% Ti and the high tenacity yarn 0.6–1.0% of Ti. The yarns obtained had a reduced luster.

The foregoing examples illustrate certain aspects of this invention but it is to be understood that the invention is not limited thereto, since many widely different embodiments may be resorted to without departing from its underlying spirit and scope. Thus, while titanyl sulfate is preferred for use, other water-soluble tetravalent titanium compounds, such as titanium sulfate, titanium chloride, titanyl chloride, titanium lactate, titanium glycolate, etc., can also be employed.

The titanium content of the regenerated cellulose film will be governed by the activity of the titanium compound which is used in effecting treatment thereof, the concentration of the titanating solution, as well as the time and temperature of treatment of the film. Thus, it may vary from about 1% to as high as 30% of $TiO_2$, by weight, by varying the $TiO_2$ concentration of the titanium salt employed and the time and temperature of treatment. Preferred amounts range from 5–20%.

The time expended in treating or soaking of the cellulosic substance in the titanium solution is usually of relatively short duration and may range from, say, 5 minutes to 30 minutes, depending on the temperature and titanium concentration of the treating medium. With the preferred titanyl sulfate reagent a period of from 5 to 15 minutes at room temperature usually suffices. The temperature of the treating solution may range from 0° C. to 70° C., a preferred temperature being from 15° C. to 30° C. Less delustering takes place at the lower temperatures.

If the films are treated with a titanating solution, such as titanyl sulfate, and simply washed in water after removal from the titanating bath, they become milky and appear delustered on drying. Apparently colloidal $TiO_2$ is precipitated within the film and on its surface. However, if the film is put directly into an ammonia solution or other alkaline solution, such as that of an alkali metal hydroxide or carbonate, after removal following soaking from the titanating bath, it remains perfectly clear and free of sulfates, and contains more titanium than in the first case. The transparency and insolubility in cuprammonium solution of films as treated indicate that a chemical combination of titanium and cellulose occurs, in contrast to many prior art delustering processes which depend largely on the precipitation of titania on the surface of cellulose articles treated.

I claim as my invention:

1. A process for producing a transparent cellulose titanate film comprising soaking a regenerated cellulosic film in a titanating aqueous solution of a titanium salt sufficient in amount to combine with the cellulose from 1–30% by weight, calculated as $TiO_2$, of titanium, and then washing the treated product with a dilute alkaline solution.

2. A process for producing a transparent cellulose titanate film comprising soaking a regenerated cellulosic film in a titanating aqueous solution of titanyl sulfate sufficient in amount to combine with the cellulose from 1–30% by weight, calculated as $TiO_2$, of titanium, and then washing the treated product with a dilute alkaline solution.

FRANK KERR SIGNAIGO.

REFERENCES CITED

The following references are of record in the file of this patent:

UNITED STATES PATENTS

| Number | Name | Date |
|---|---|---|
| 1,717,483 | White | June 18, 1929 |
| 2,009,015 | Powers | July 23, 1935 |
| 2,009,657 | Hagedorn et al. | July 30, 1935 |
| 2,122,793 | Dreyfus | July 5, 1938 |
| 2,404,910 | Keller | July 30, 1946 |

FOREIGN PATENTS

| Number | Country | Date |
|---|---|---|
| 343,121 | Great Britain | Feb. 6, 1931 |